United States Patent [19]

Bapst et al.

[11] 4,417,242

[45] Nov. 22, 1983

[54] METHOD FOR CONNECTING OR DISCONNECTING SELECTED STATIONS IN A RING COMMUNICATION SYSTEM, AND RING COMMUNICATION SYSTEM INCLUDING SELECTIVELY CONNECTABLE STATIONS

[75] Inventors: Urs Bapst, Kilchberg; Heinz Keller, Ruschlikon, both of Switzerland; Heinrich Meyr, Aachen, Fed. Rep. of Germany; Hans R. Muller, Langnau, Switzerland

[73] Assignee: International Business Machines Corp., Armonk, N.Y.

[21] Appl. No.: 353,746

[22] Filed: Mar. 1, 1982

[30] Foreign Application Priority Data

Mar. 12, 1981 [EP] European Pat. Off. ...... 81 101 825.8

[51] Int. Cl.³ .................. H04Q 9/00; H04L 7/08; H04J 3/08
[52] U.S. Cl. .................. 340/825.05; 340/825.2; 370/86; 375/107
[58] Field of Search .............. 340/825.05, 825.2; 455/13, 14; 370/86, 16, 17; 375/110, 120, 107; 371/11

[56] References Cited

U.S. PATENT DOCUMENTS

Re. 28,577 10/1975 Schmidt .................................. 455/13
Re. 28,958 9/1976 Zafiropulo et al. ............ 340/825.05
4,002,847 1/1977 Dail ...................................... 370/16
4,042,783 8/1977 Gindi .................................... 370/86
4,334,305 6/1982 Girardi ................................. 370/86

OTHER PUBLICATIONS

European Patent Application, 0006325, Published Jan. 9, 1980, Champlin et al.

*Primary Examiner*—Donald J. Yusko
*Attorney, Agent, or Firm*—John B. Frisone

[57] ABSTRACT

In a ring communication system comprising selectively connectable data stations, each station has connecting circuitry including a phase-locked loop arrangement (111) which is frozen at its current frequency and phase in response to a signal interruption caused by a station insertion or removal operation. Control logic (113) generates a freeze control signal in dependence of the signal energy status on input lines (75). This control signal activates gates (149, 151) and switches (155, 157) to interrupt change control signals of the phase-locked loop circuitry and to keep an oscillator control voltage at a given value. The control logic also provides an auxiliary data signal during the freeze interval which is applied to the ring to keep stations downstream in synchronism. By this method and arrangement, undesired reactions and excursions of the phase-locked loop circuitry in response to a signal energy outage are prevented, and synchronization can be rapidly regained after station insertion or removal.

12 Claims, 9 Drawing Figures

FIG. 3 RING ADAPTER

FIG. 4 DISTRIBUTION PANEL

FIG. 5A
TIMING & CONTROL UNIT TCU

FIG. 5B
TIMING & CONTROL
UNIT TCU

FIG. 6
CONTROL LOGIC IN TCU

METHOD FOR CONNECTING OR DISCONNECTING SELECTED STATIONS IN A RING COMMUNICATION SYSTEM, AND RING COMMUNICATION SYSTEM INCLUDING SELECTIVELY CONNECTABLE STATIONS

Present invention is concerned with communication systems comprising a closed loop transmission ring for a plurality of data stations, and in particular with a method and means for efficiently connecting or disconnecting selected stations to or from said transmission ring, respectively.

Numerous ring communication systems are known which include a given number of permanently attached data stations. If new stations are to be added to such a system, or if a station is to be removed, service will be interrupted for some time for connecting or disconnecting, and transmission has to be newly initialized after such interruption.

In large communication systems for a great number of data stations it is desirable to be flexible and to have the possibility to attach and remove stations easily for adapting station distribution to current needs.

A ring system which simplifies the adaptation to changing requirements is the IBM transmission ring described in the manual "IBM 8100 Information System, Communications and Loop Description", Form No. GA27-2883. In this loop system, concentrator and connector units are provided which have ports or outlets for plugging-in station connector cables, and which comprise relay switches for selectively inserting or removing station extension loops into or from the basic loop.

This system allows to prewire a large number of outlets for station insertion so that data stations can be moved around in an installation and can be placed and connected wherever they are currently required.

Each station insertion or removal operation in this system requires, however; a subsequent resynchronization of stations downstream from the location where the switching operation is effected, due to a change in the loop delay characteristic and to disturbances in the data signal stream.

In many communication devices, phase-locked loop circuitry is used for synchronizing operation of the device and of attached units to the data stream received from another device or from a controller. Such phase-locked loop circuitry, shortly termed PLL circuitry in the following, is described and analyzed in a publication by S. C. Gupta "Phase-Locked Loops", which appeared in Proceedings of the IEEE, Vol. 63, No. 2 (February 1975), pages 291–306, and in a more recently published book by F. M. Gardner "Phaselock Techniques", John Wiley, New York 1979.

The PLL arrangements change the frequency and phase of a locally generated clock signal in response to the difference between the current local frequency and phase and those of a reference signal, e.g. of a received data signal. If, after synchronization is achieved, only small frequency and phase changes occur in the data signal, the PLL circuitry can easily follow these changes. If, however, extreme changes occur, the PLL circuitry will be so disturbed that it needs a considerable time interval before it has adapted to the new situation.

Dual-mode PLL arrangements which can select between a fast and a slow mode for more efficient adaptation in situations where large changes occur were suggested in the book by Gardner on page 89. The signal disturbances, however, which are caused by insertion or removal of a station in a ring system, will provoke even in such dual-mode PLL circuits which are located downstream of the inserted or removed station a prolonged interval of adaptation during which synchronization is not guaranteed.

The invention offers a solution for this problem.

It is an object of the invention to enable in a ring communication system comprising PlL circuitry for each station, insertion or removal of stations during operation of the system with a minimum of disturbance. Another object is to reduce the time interval required until full system resynchronization after a station insertion or removal operation in such a system. A further object of the invention is to devise circuitry for such ring communication systems which allows efficient switching for station connection or disconnection.

The objects can be achieved by the invention because a freezing of the PLL circuitry is provided at its frequency and phase values when a signal energy outage due to station switching is detected.

The freeze interval prevents an overreaction of the PLL circuitry to the signal disturbance which is caused by station insertion or removal. In most cases, only a small frequency and phase adaptation will be necessary after the connection or disconnection operation, if the PLL circuitry is maintained at its current values when the short switching disturbance starts. Thus, complete resynchronization is achieved very fast, and most stations will not even recognize the fact that a station was inserted or removed.

An embodiment of the invention is described in the following in connection with drawings.

BASIC STRUCTURE OF SYSTEM

Figure 1:
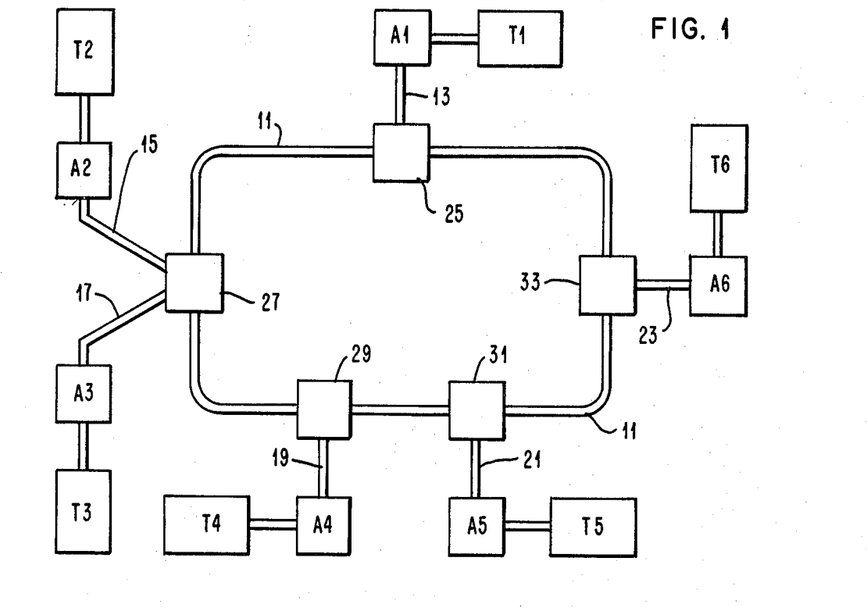
FIG. 1 A block diagram of a multi-station ring communication system in which the invention finds application, FIG. 2 basic structure of the switching unit and ring adapter for attaching a station to the transmission ring in the system of FIG. 1, FIG. 3 a block diagram of one ring adapter of FIG. 1, FIG. 4 a block diagram of one switching unit or distribution panel of FIG. 1, FIGS. 5A/5B a detailed block diagram of the timing and control unit of the ring adapter of FIG. 4 comprising a phase-locked loop and incorporating the invention, FIG. 6 a block diagram of the control logic for the timing and control unit of FIGS. 5A/5B, FIGS. 7A/7B details of the switch control and power supply arrangement of the ring adapter of FIG. 3.

FIG. 1 shows an overall survey of a communication system in which present invention is used. A closed-loop transmission ring 11 is provided for transferring data between a plurality of stations T1 . . . T6. Each station has a ring adapter A1 . . . A6 which connects it to a branch line (13, 15, 17, 19, 21, 23). Branch lines are coupled to the transmission ring (11) by means of switching units (25, 27, 29, 31, 33) called "distribution panels". Each distribution panel can either insert a branch line and the corresponding attached station into the ring, or it can bypass the branch line and station by closing the ring.

As shown in FIG. 1, a distribution panel may connect one station (T1) or a plurality of stations (T2, T3), e.g. up to 16 stations, to the transmission ring. The different switching states of a distribution panel will be explained in connection with FIG. 2.

The stations comprise devices such as computers, file storage units, display units, printers, keyboards and include microprocessors for control and processing functions.

The transmission ring and the branch lines may be provided either for electrical signals (wires, coax cables) or for optical signals (optical fibers). It is also possible that the ring transmits electrical signals while the branch lines transmit optical signals if the necessary converters are provided in the distribution panels. The transmission ring may be provided in duplicate with a main and an auxiliary loop transmitting in opposite directions. This allows reconfiguration of the ring in case of some failure if the necessary wrap and switching functions are provided in distribution panels.

To simplify the description, presently disclosed embodiment has a single, unidirectional electrical transmission ring without wrap functions, and each branch line includes two twisted pairs of electrical wires.

The present system is particularly suitable as an in-house communication facility. Thus, the transmission ring may have one or a few distribution panels in each building of a group of buildings, and branch lines 13 . . . 23 may be either rather short if the station is located in a room close to the distribution panel, or they may have a length up to several hundred meters for remotely located stations in a large building, depending on the cable attenuation.

At the end of each branch line, a wall plug for inserting the connector of a station's ring adapter may be provided. Thus, the transmission network has a basic ring configuration with star-like extensions or branches connected to it.

To allow flexibility in the organization of the in-house communication system, addition, elimination or relocation of terminal stations are easily possible. Any station and its ring adapter can simply be plugged into or out of a wall outlet directly at a distribution panel, or at the remote end of a fixedly installed branch line; a short insertion or removal procedure will be carried out for adapting the system to the new situation, as will be explained in the sequel. The present invention offers an improvement for such insertion/removal procedures.

PRINCIPLES OF SYSTEM OPERATION

In present embodiment, stations are considered equal-ranking units which have a decentralized organization of operation. One of the stations, e.g. station T1, has some additional monitoring functions such as providing continuous clocking, error recovery, initialization of ring operation, etc. No more details need be given here as such systems are well-known already. The invention is of course also applicable to a ring communication system having a central host data processing system (in place of station T1) and a plurality of stations whose operation is centrally controlled by the host once they are inserted into the ring, or a system having a mixture of distributed and centralized data control.

Data transmitted on the ring are coded in a form known as "Manchester Code". More information about this type of signal coding can be found in U.S. Pat. No. 3'980'826, inventor A. X. Widmer, and in an article "Manchester coding with predistortion: An efficient and simple transmission technique in local digital ring networks" by H. Meyr et al., published in Proceedings, National Telecommunications Conference, Houston, Nov. 30-Dec. 4, 1980, pp. 65.4.1–65.4.7, so that no further detailed description is necessary here. The Manchester Code allows extraction of clock information from the data signal by particularly simple circuitry because of its high transition density, and even during long sequences of identical bit values because the clock extraction is practically independent of the data transmitted.

Data signals transmitted around the ring pass through the ring adapter of each station that is operating and inserted into the ring. Thus, each such station can keep itself synchronized to the data stream, and it can accept data addressed to it or can transmit data onto the ring when it is allowed to do so according to a given protocol. When a station is being inserted into the ring or removed from it, there will be a short interruption of the data stream causing a short disturbance of the synchronization. As the invention is concerned with these phenomena, they will be described in more detail in the sequel.

Each station comprises a phase-locked loop (PLL) circuit for synchronization. The PLL circuit follows the frequency and phase of the received data signal and is locked when the local oscillator is in synchronism with the data signal received. As this PLL circuitry is important for the present invention, it will also be more fully described in the following.

SWITCH FUNCTION OF DISTRIBUTION PANELS

Figure 2:
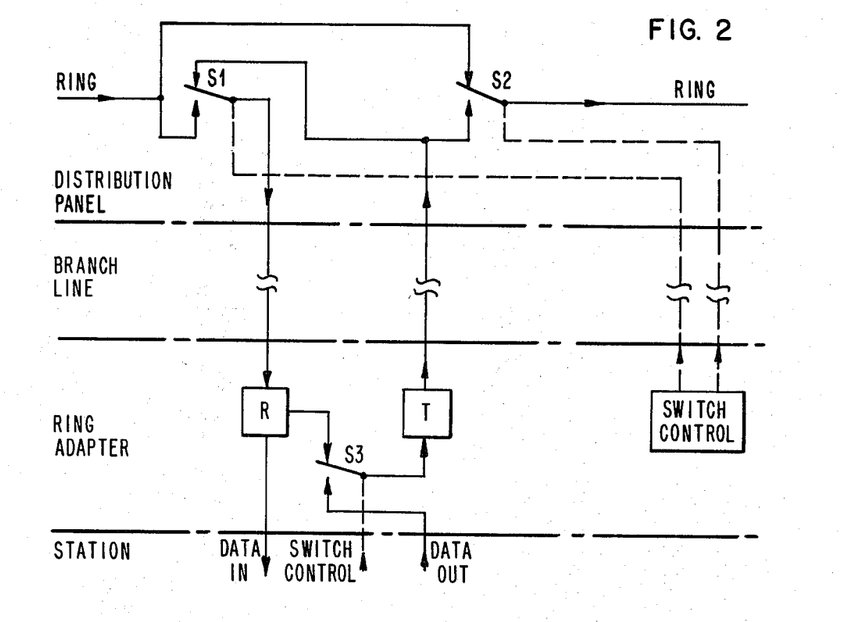

FIG. 2 shows in a schematic diagram the switching functions of a distribution panel in the transmission ring. The distribution panel has two switches S1 and S2. A third switch S3 which is part of the station's ring adapter is also shown to fully explain the switching functions. Three basic situations are possible:

(a) Bypass State: S1 and S2 in home position (as shown in FIG. 2): In this state, the station is completely isolated or disconnected, and data signals on the ring are passed on by switch S2.

(b) Listening State: S1 activated, S2 in home position: In this state, the station receives all signals through receiver R so that it can be synchronized, but it cannot transmit, and data signals on the ring are passed on by switch S2.

(c) Inserted State: S1 and S2 both activated: In this state, the ring is interrupted and all data must pass through the station's ring adapter.

The station receives and monitors all data. When switch S3 is in its home position as shown, received data are repeated by transmitter T and retransmitted on the ring. When switch S3 is activated, the station can transmit its own data (received data are eliminated).

All lines and switches shown in FIG. 2 are of course provided in duplicate. The two wire pairs from S1 to R and from T to S2 could be replaced by a single wire pair if respective 2-to-4 converters were provided at the distribution panel output and the ring adapter input.

Switches S1 and S2 in the distribution panel are powered and controlled from the respective attached ring adapter.

This ensures that if no station is inserted or if there is a failure in the station, switches fall back to state (a) which is shown in FIG. 2, so that the ring can operate properly without interruption. Some powering and control lines can be provided between ring adapter and distribution panel, besides the branch lines for information signals. It is possible, however, to use the information branch lines also for DC powering and for switch control signals if some phantom circuitry is added, as will be shown in FIGS. 3 and 4.

In case of distribution panels for more than one station, such as distribution panel 27 in FIG. 1, the switches or switch functions shown in FIG. 2 are provided separately as many times as branch lines, i.e. stations are to be connected.

BASIC STATION INSERT/REMOVE OPERATION

When a station is inserted into or disconnected from the ring, certain operational procedures have to be followed. Two slightly different procedures are considered for inserting, depending on the distance of stations from the ring, or the length of branch lines, respectively.

If a station and its adapter is connected by a short branch line to the ring, it can be set into listening mode after plugging in the cable, and before actually inserting it into the ring. I.e., switch S1 (FIG. 2) is activated, and the station can listen to data signals on the ring prior to the insert operation. The respective insertion procedure will be called "Dependent Station Switching": The monitor (or host) issues a given command (bit sequence) at regular intervals, e.g. every 2 or 5 seconds. All stations will be alerted by this command that some reconfiguration by station switching may occur and that synchronization adaptation will be necessary. Each station ready to be inserted, i.e. having switch S1 activated and having acquired synchronization already, will be caused by the command to activate switch S2. On the other hand, each station ready to disconnect will, upon receiving the command, deactivate switch S2 (and possibly also S1 if it wants to be completely disconnected).

A different procedure is necessary if stations are connected to the ring by rather long branch lines of e.g. 200 meters length. In this case, the branch lines constitute a considerable capacitive load and should not be connected to the ring unless the respective station is actually inserted. Thus, a station cannot be set into listening mode and must be inserted at once when it is ready. The station will force itself into the ring by simultaneously activating switches S1 and S2. A stream of valid data may be interrupted and will then have to be repeated (unless certain allowed switch times are observed during which no data are transmitted). Disconnecting of stations is handled in a similar manner. This procedure will be called "Independent Station Switching".

The invention allows fast resynchronization for both situations by appropriately "freezing" and "defreezing" phase locked loop circuitry in the station adapters. Respective procedures are outlined in the following.

DEPENDENT STATION SWITCHING PROCEDURE (1) Stations to be inserted activate S1, acquire frequency and phase from passing data signals, and watch passing data.

(2) Monitor issues "SWITCH" command (particular bit sequence) when no data are in transmission, followed by idling characters.

(3) Stations ready to be inserted (S1 activated) now activate S2; stations ready to be disconnected deactivate S2. Changing of the switch position of switch S2 causes a short signal interruption (energy outage).

(4) Each ring adapter of a station detecting energy outage, i.e. of each station next down stream from a station being inserted/disconnected, freezes its PLL, i.e. frequency and phase are kept constant and not adapted to received data stream. It will send an auxiliary data signal for stations further downstream so that they receive signal energy and can maintain synchronization.

(5) Each station which had an energy outage, upon reappearance of signal energy, defreezes its PLL and adapts frequency and phase to the received idling data which are repeated (no more transmission of auxiliary data).

In present embodiment, it is assumed that the monitor station (or host) will continue transmitting idling characters until any station gets access to the ring and starts transmitting (according to any of various known protocols). As an alternative, the monitor station could transmit, after a given timeout, a test pattern around the ring and issue a polling sequence after receiving it back correctly.

INDEPENDENT STATION SWITCHING PROCEDURE (1) A station and ring adapter which are ready to be inserted interrupt the ring and thus the signal stream by activating switches S1 and S2 in the associated distribution panel. This will cause a short signal interruption on the ring.

(2) The next station down the ring detects the energy outage (interruption of signal energy on the ring) and does the following: It freezes its PLL circuitry to maintain frequency and phase of its internal clock; its starts transmitting a sequence of idling bits (e.g. all "ones") as auxiliary signal so that the other stations further downstream receive signal energy and can maintain synchronization.

(3) When the ring adapter of the station to be inserted closed switches S1 and S2 in the associated distribution panel in their new (activated) positions, the arriving signal stream is repeated and reapplied to the ring through receiver R and transmitter T (FIG. 2). The station now receives the signal propagating on the ring, and can synchronize itself to these data with the aid of its phase locked loop circuitry. Initially it will operate in a fast or broadband mode to achieve rapid acquisition, and then it will change to a slow or smallband mode (as will be explained later).

(4) The next station downstream on the ring which had frozen its PLL circuitry will detect the reappearance of signal energy now repeated by the preceding newly inserted station. It then defreezes its PLL circuitry so that this can follow again the frequency and phase variations in the received signal. It also stops transmitting the auxiliary signal (idling bits) and instead repeats the received signal.

The same procedure is followed when a station is disconnected, except that first the inserted loop is interrupted by opening the activated-state contact positions of S1 and S2, and then the ring is closed again by closing the inactivated-state contact positions of S1 and S2. The next station downstream will freeze its PLL when signal energy ceases, and will defreeze it when energy reappears, and in the meantime it transmits idling bits (i.e. events in the next station are identical for insertion and disconnection).

ADVANTAGES

As is easily understood, the freezing of PLL circuits avoids that existing frequency and phase of local oscillators is completely lost due to the disturbances caused by switching or energy outage on the ring. After completion of a switching procedure (station insertion or removal), when PLL circuitry is activated again by defreezing, it must in most cases adapt only to small frequency or phase variations so that complete synchronization of stations on the ring is achieved very rapidly, i.e. much faster as in a situation where a completely new acquisition of frequency and phase were required.

RING ADAPTER DETAILS

Figure 3:
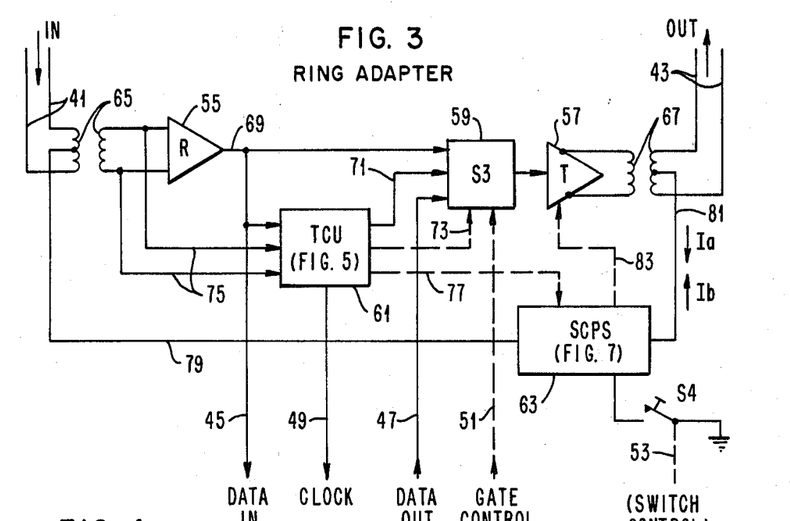

FIG. 3 is a block diagram of a ring adapter which on one side is connected to the two wire pairs 41, 43 of a branch line, and on the other side to interface lines of a terminal station. These interface lines include a data-in line 45, a data-out line 47, a clock signal line 49, and a gate control signal line 51. It may further include a switch control signal line 53.

The ring adapter mainly comprises a receiver (R) 55, a transmitter (T) 57, a gating circuit (S3) 59 between them, and a timing and control unit (TCU) 61. In addition, a switch control and dc power source (SCPS) 63 is provided.

The input of receiver 55 is connected through a transformer 65 to input wire pair 41, and the output of transmitter 57 is connected through a transformer 67 to output wire pair 43. The output 69 of receiver 55 is connected to the station's data-in line 45, and also to TCU 61 and to gating circuit 59.

This gating circuit has as further inputs the station's data-out line 47, and an auxiliary data output line 71 of TCU 61. It can be controlled either by a gate control signal from the station on line 51, or by an auxiliary control signal on a line 73 from TCU 61. Depending on these control signals, gate S3 (59) will transfer data signals from either of its three inputs to transmitter 57. Thus, it is possible to gate signals received from the transmission ring back to the ring (besides transferring them into the station on line 45), or to transfer instead data signals supplied by the station on line 47 to the ring, or to apply auxiliary signals from timing and control unit (TCU) 61 to the ring.

Figure 5A:
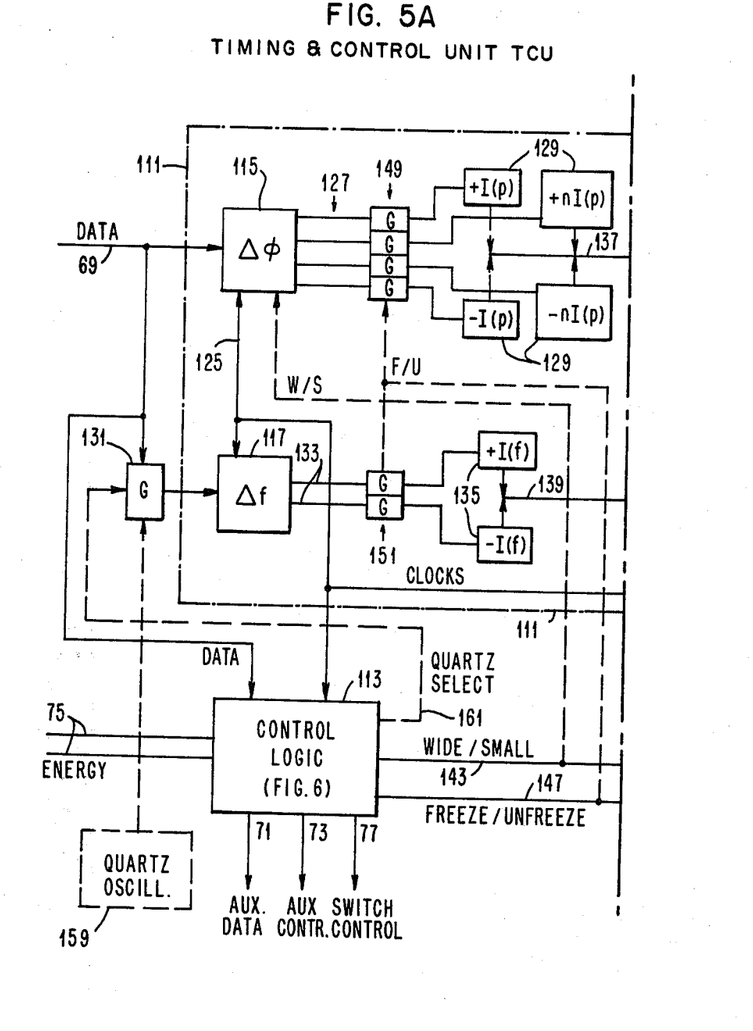
Figure 5B:
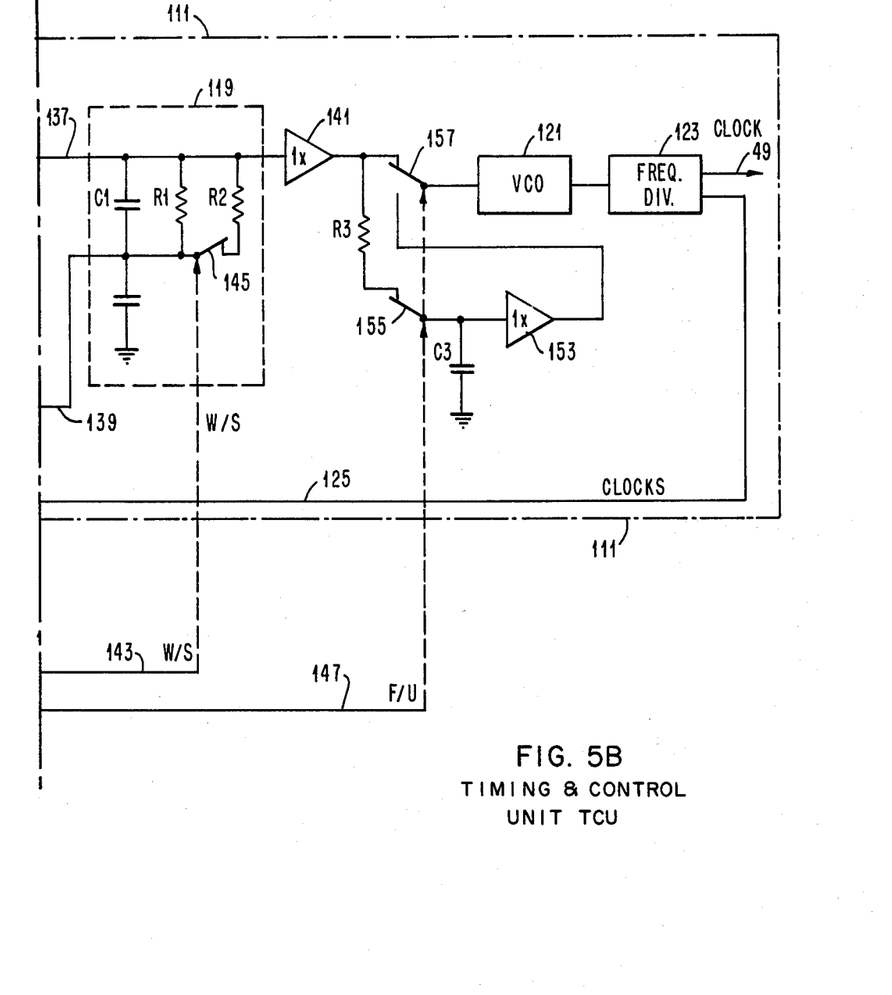

The function of TCU 61 is primarily to extract a clock signal from the received data signal supplied to it by receiver 55 and to furnish this clock signal on line 49 to the station. TCU 61 further detects certain events such as commands in the data signal, or energy outage and reappearance at the output of transformer 65 to which it is connected by lines 75. Depending on the detected event, it furnishes on lines 71 and 73, respectively, auxiliary data and an auxiliary control signal to maintain a data signal stream on the transmission ring, or it emits a control signal on line 77 to effect an insertion into or disconnection from the ring, respectively, by control of the switches in the distribution panel (procedure to be explained later). Timing and control unit 61 is important to the invention and will be explained in more detail in connection with FIG. 5.

The function of switch control and power source (SCPS) 63 is to control the setting of switches S1 and S2 in the associated distribution panel. As was indicated in a previous section, the switches are powered and controlled from the ring adapter but in the present embodiment, no separate power and control lines are provided. Rather, the two twisted wire pairs 41 and 43 are used in a phantom circuit for this purpose.

SCPS 63 is connected by line 79 to a center tap of the primary in transformer 65, and by line 81 to a center tap in the secondary of transformer 67. SCPS 63 can furnish a dc current in either direction (Ia and Ib, respectively) for either activating only S1 or activating both S1 and S2, respectively. The other part of the phantom circuit located in the distribution panel, and operation of switches S1 and S2 will be explained in the next section in connection with FIG. 4.

Switch control and power source 63 also provides a disabling control signal to transmitter 57 on line 83 during the switchover interval of S2, to ensure a minimum duration of the resulting energy outage.

SCPS 63 is e.g. excited by operation of a manual switch S4. When the station is ready to be inserted, the operator has to close S4. When he wants to disconnect an inserted station, he must open S4. The desired operation (insertion or disconnection) will be effected automatically after setting of switch S4, as will be explained later. Instead of providing a manual switch at the ring adapter box, an internal switch S4 could as well be installed which is actived or deactived by a control signal from the station on line 53.

More details of the switch control and power source will be given in connection with FIG. 7.

DETAILS AND OPERATION OF SWITCHES IN DISTRIBUTION PANEL

Figure 4:
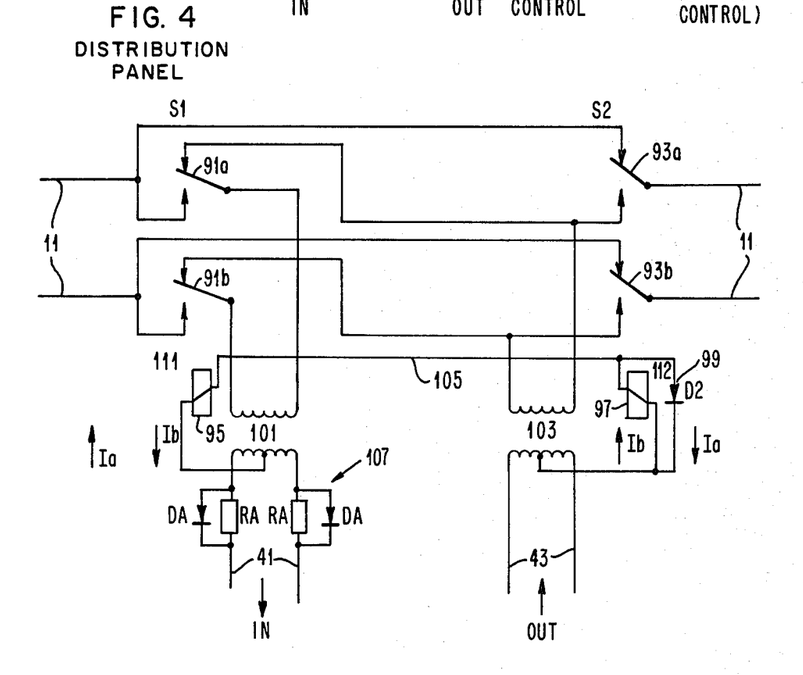

FIG. 4 shows more details of a distribution panel which was schematically illustrated in FIG. 2. It is connected between two sections of the two-wire (or coax cable) transmission ring 11, and is also connected to twisted wire pairs 41 (data in to station) and 43 (data out from station). Switches S1 and S2 are both duplicate double-throw switches 91a/91b and 93a/93b, respectively. Switch S1 can be activated by energizing a magnet 95 (M1), switch S2 is operated by energizing magnet 97 (M2) which is shunted by a diode 99 (D2). The switches are shown as electromagnetic relays, but could of course also be implemented in another technology.

Transformer 101 transfers signals from the center contacts of S1 to wire pair 41, and transformer 103 transfers signals from wire pair 43 to the break contacts of S1 and the make contacts of S2 (both interconnected). The connections between switch contacts and transmission line 11 are as shown in the drawing.

An energizing line 105 serially interconnects a center tap of transformer 101, magnet M1, magnet M2 and a center tap of transformer 103. This completes the phantom circuit for controlling the switches by dc circuits. Impedance conversion circuitry 107 consisting of two resistors RA and two diodes DA is provided in wire pair 41, for controlling the input impedance by the switch control dc circuits.

Operation is as follows:

If no dc current is applied to wires 41 and 43 of the branch line, switches S1 and S2 are in their home positions as shown in the drawing. The ring lines are "closed", wire pairs 41 and 43 are disconnected from the ring. The station and ring adapter are in a local wrap condition so that, for testing purposes, signals emitted by the station's transmitter are immediately returned to its own receiver.

If the switch control in the ring adapter applies a current Ia to the wire pairs, flowing from wires 41 to wires 43, M1 will be energized and S1 will be thrown over, while the current bypasses M2 through D2. Thus, data signals are transferred to wire pair 41 and to the station (listening state), but they are also passed on along the ring. Wire pair 43 remains isolated from the ring. Impedance conversion circuit 107, biased by current Ia, will cause a high input impedance, i.e. there will be almost no load on the ring but enough signal energy for listening will be transferred to the station.

If the SCPS 63 in the associated ring adapter applies a current Ib to the wire pairs, flowing from wires 43 to wires 41, both M1 and M2 will be energized and both switches S1 and S2 will be activated (station inserted) because no current flows through D2. Due to diodes DA in impedance conversion circuit 107, a low input impedance will be seen so that all signal energy arriving on the transmission ring is transferred to the station. The outgoing section of transmission ring 11 is then only connected to wire pair 43, and no more directly to the incoming section of ring 11.

It should be noted that during the transition of switch S2 from one position to the other, there is a short period of interruption lasting a few milliseconds during which no signal energy will be applied to the outgoing section of transmission ring 11. This is important for the insertion and disconnection procedures in which the energy outage is used as a criterion for freezing PLL's. In order to avoid unstable situations due to contact bouncing during the switchover interval, transmitter T (57) in the respective ring adapter is disabled to achieve a clear energy outage for a guaranteed interval of time.

TIMING AND CONTROL UNIT

The timing and control unit 61 of the ring adapter (FIG. 3), shortly termed TCU, will be explained in more detail in this section in connection with FIG. 5. As mentioned earlier, TCU 61 furnishes the clock signal for the station, a switch control signal for insertion/disconnection procedures, and some auxiliary signals for occupying the transmission ring during station switching or disturbance intervals.

Essentially, TCU 61 comprises phase-locked loop circuitry 111 (PLL) which tries to keep a local oscillator at the same frequency and phase as a received data signal, and control logic circuitry 113 therefor.

The PLL includes a phase error detector 115, a frequency error detector 117, a filter circuit 119, and a voltage controlled oscillator (VCO) 121 followed by a frequency divider 123.

Phase error detector 115 receives the data signal on line 69 and feedback clock signals on lines 125 and furnishes on lines 127 four current control signals for four current sources 129. Similarly, frequency error detector 117 receives the data signal from line 69 through a gating circuit 131 and the feedback clock signals on lines 125, and furnishes on lines 133 two current control signals for two current sources 135. The currents from sources 129 and 135 are applied through lines 137 and 139 to filter circuitry 119 which comprises two capacitors C1, C2 and two resistors R1, R2. The output voltage of circuitry 119 is applied through a unity gain amplifier 141 to VCO 121. Depending on the error between the feedback clock signals and the received data signal, none or some of the currents $\pm I(p)$, $\pm n\, I(p)$, and $\pm I(f)$ will be selected for loading/unloading capacitors C1 and C2 to change the control voltage and thus adapt the output clock signal of VCO 121 to the received data signal.

The PLL circuitry has two specific features which will be described in the sequel.

(a) Dual-mode Operation:

Depending on the magnitude of the phase error, the PLL will be either operated in wideband mode allowing fast changes for transient conditions, or in smallband mode allowing only slow changes which is sufficient for an almost quiescent situation. A respective WIDE/SMALL control signal is provided for this purpose by control logic 113 on line 143. This signal is furnished to phase error detector 115 and to a switch 145 in filter circuitry 119. While phase error circuit 115 selects the direction of the current in dependence of the error (either + or − or no current), it selects the high current sources $\pm n\, I(p)$ for wideband operation, and the low current sources $\pm I(p)$ for smallband operation. Switch 145 changes the time constant of filter circuitry 119 by either connecting or disconnecting shunt resistor R2.

The changing between two operation modes, i.e. small or wide bandwidth (small or large gain) has the following advantage: In wideband mode, rather fast adaptation under initial or transient conditions is possible. In smallband mode, reduced response speed is sufficient for small phase errors, but stability is improved due to noise rejection and jitter elimination.

(b) Freezing of PLL:

An important feature of present invention is the controlled short-time freezing of the PLL circuitry during a switching procedure for station insertion/disconnection, to avoid loss of, or a large deviation from, already acquired frequency and phase. The TCU has additional means to allow controlled PLL freezing.

Control logic 113 has an extra output line 147 for a FREEZE/UNFREEZE control signal (development of this signal and details of control logic 113 will be explained with FIG. 6). Gates 149 are provided for control lines 127 between phase error detector 115 and current sources 129, and gates 151 are provided for control lines 133 between frequency error detector 117 and current sources 135. These gates are connected to line 147 to be controlled by the FREEZE/UNFREEZE signal. Thus, as part of a PLL freeze operation, gates 149 and 151 can be closed to inhibit the transfer of current control signals so that any excessive current control signals due to a data signal interruption have no effect on the control voltage generated in circuitry 119.

Sample-and-hold circuitry for the control voltage is also provided to enable effective freezing (additional smoothing effect is explained in next section). A capacitor C3 and resistor R3 are connected to the output of amplifier 141 so that the charge of C3 reflects the current control voltage, which is applied to a second unity gain amplifier 153. Two switches for this sample-and-hold circuitry are controlled by the FREEZE/UNFREEZE signal on line 147. They are activated when the PLL is frozen to disconnect C3 and VCO 121 from filter circuitry 119, and to connect the VCO input to the voltage of C3 through amplifier 153. Thus, any change of the VCO output signal due to unloading of the capacitors during a freeze interval is avoided.

Additional details of TCU:

Details of control logic 113 will be given in the next section in connection with FIG. 6.

An additional quartz oscillator 159 may be provided for improving operation of the PLL. Its output signal can be furnished to frequency error detector 117 through gate 131. This gate can be controlled by a select signal on an additional output line 161 from control logic 113. While in normal operation the data signal on line 69 is furnished to detector 117, this may be impossible under certain circumstances, e.g. when the data signal transmission on the ring is interrupted for more than the normal insertion timeout interval, or when a terminal must be inserted without prior "listening". In these situations, the quartz oscillator signal can replace the missing data signal to allow maintenance of acquired frequency, or initial frequency acquisition in the PLL. It is of course also possible to connect frequency error detector 117 only to a local quartz controlled oscillator, and to eliminate gate 131 and the connection to data line 69.

An important advantage of the sample-and-hold circuitry, i.e. the serial connection of R3 and C3 at the input of VCO 121 is that it has a smoothing effect (when switches 155 and 157 are not activated): The rippling effect of filter circuitry 119, particularly in wideband mode, i.e. during fast acquisition, is eliminated. This is most useful in "collision" situations, i.e. when two neighbour stations both are inserting or disconnecting.

Detailed circuitry for error detectors 115 and 117, current sources 129 and 135, unity gain amplifiers 141 and 153, and for voltage-controlled oscillator 121 need not to be given here because such functional units are well known in the art. An implementation of the PLL circuitry described was built in which the heart of the PLL (VCO, control voltage circuit, unit gain amplifier and current sources) were implemented by analog circuitry and the remaining portion in digital technology. The whole PLL circuitry could be built, however, as well in analog technology.

An additional improvement could be provided in the phase and frequency error detectors 115 and 117. If only a single transition, or given small number of transitions is missing in the received data signal, the generation of a current control signal could be inhibited for that short interval so that a false correction of the control voltage for the VCO would be avoided (which would otherwise be effected by the missing signal transitions). Missing signal transitions could either be due to a short error burst, or to an intended code violation (for marking frame starts, etc.). Furthermore, if a threshold function is provided in the phase error detector, small phase variations due to jitter will not result in respective current control signal changes.

CONTROL LOGIC IN TCU

Figure 6:
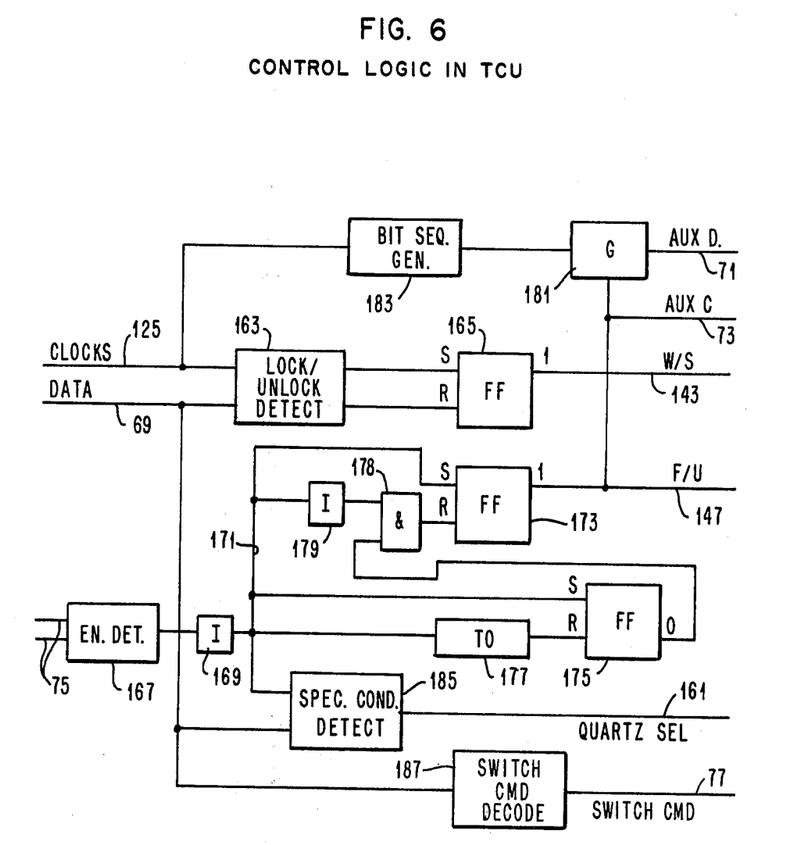

FIG. 6 is a block diagram of control logic 113 for the TCU/PLL circuitry (FIG. 5) of the ring adapter.

For generating the WIDE/SMALL mode control signal, a lock/unlock detector 163 and a latch 165 are provided. In detector 163, the locally generated clocks (on line 125) define four periodic quadrants, the midvalues of which are 0, 90, 180 and 270 degrees. The detector counts over time intervals of given length, how many of the level transitions in the received data signal (on line 69) correctly fall into the first or third quadrant, and how many fall incorrectly into second or fourth quadrant. If the ratio correct/incorrect is larger than a given first limit, the PLL is considered to be locked, and the reset signal for latch 165 is activated so that the control signal will indicate smallband mode. If, however, the ratio is below a given second limit (lower than the first limit to avoid frequent mode changes), the set signal for latch 165 is activated to cause a control signal on line 143 selecting the wideband mode.

Freezing of the PLL circuitry during a switching (insertion/removal) operation of the loop is controlled by an energy outage, i.e. lack of signal energy on the loop that is detected by control logic 113 which generates a respective FREEZE/UNFREEZE control signal, and causes the transmission of auxiliary data signals, as shown in FIG. 6.

An energy detector 167 detects when signal energy is present on input lines 75. Inverter 169 activates the control signal on line 171 when an energy outage occurs. This signal sets latch circuit 173 which, on its output line 173, furnishes the FREEZE/UNFREEZE signal for controlling other parts of the PLL circuitry as was explained in connection with FIG. 5.

In order to guarantee a minimum duration of the FREEZE control signal, a second latch 175, timeout circuit 177, AND gate 178 and inverter 179 are provided. When the no-energy control signal is first activated on line 171, also latch 175 is set, and its complement output signal, when deactivated, inhibits AND gate 178, to prevent resetting of latch 173. However, timeout circuit 177 will reset the second latch 175 after a preselected time, so that AND gate 178 is enabled again to allow resetting of latch 173. Thus, reappearance of signal energy, i.e. deactivation of the no-energy signal on line 171, can cause through inverter 179 a resetting of latch 173 only after the preselected time. Short energy outages which occur within the selected time interval will therefore produce only a single freeze signal of given duration.

Activation of the FREEZE signal will also cause activation of the auxiliary control signal on line 73, which will in turn open gate circuit 181 to furnish the output of a bit sequence generator 183 as auxiliary data signal to line 71. The auxiliary control signal on line 73 also opens gate 59 (S3 in FIG. 3) so that the auxiliary data on line 71 can be furnished to the transmitter of the ring adapter during an energy outage interval.

A special condition detector 185 is connected to data line 69 and to the no-energy indicator line 171. It issues a quartz oscillator select signal on line 169 for gate 131 when any one of several predetermined conditions is encountered (e.g. unrecognizable data signals, or energy outage for an extended time interval).

A switch command decoder 187 is connected to data line 69. It furnishes a switch control signal on line 77 to SCPS 63 (FIG. 3) when a switch command bit sequence was received. The switch command decoder is only required when the dependent station switching procedure is implemented in the system (i.e. when switching for station insertion or disconnection is only effected by a switch command issued by a controller or monitor).

SWITCH CONTROL AND POWER SOURCE

Figure 7A:
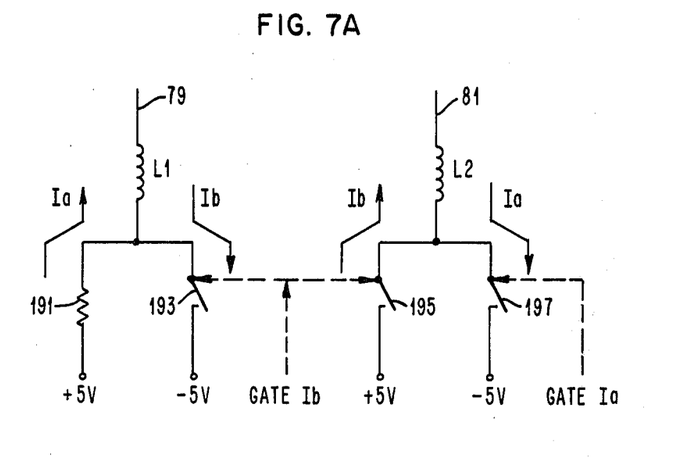
Figure 7B:
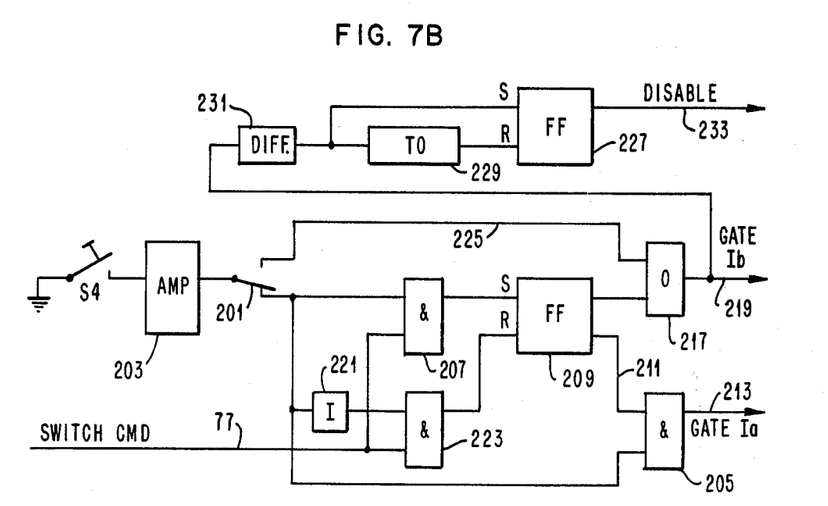

Unit SCPS 63 in the ring adapter (FIG. 3) which generates signals for operating the switches in the associated distribution panel (FIG. 4) is shown in FIGS. 7 (7A, 7B) and will now be described briefly.

The current source for supplying selectively two currents Ia and Ib of opposite direction is schematically illustrated in FIG. 7A. Its one supply line 79 is connected through an inductivity L1 to the parallel arrangement of a resistor 191 attached to +5 V supply and a switch 193 attached to −5 V supply. The other supply line 81 is connected through an inductivity L2 to the parallel arrangement of a switch 195 attached to +5 V supply and a switch 197 attached to −5 V supply. Switches 193 and 195 can be activated in parallel by a control signal "GATE Ib", and switch 197 can be activated by a control signal "GATE Ia".

If none of the three switches is activated, no current flows. If switch 197 is activated by "GATE Ia", dc current Ia flows from +5 V through line 79 to the distribution panel (where it activates switch S1 only) and back through line 81 to −5 V. If switches 193 and 195 are activated by "GATE Ib", dc current Ib flows from +5 V through line 81 to the distribution panel (where it activates both switches S1 and S2) and back through line 79 to −5 V.

Logic circuitry for generating control signals "GATE Ia" and "GATE Ib" is shown in FIG. 7B. The necessary control signals depend on the station insertion procedure selected, i.e. whether a station is first put into listening mode and then inserted when a respective command is received, or whether the station is directly inserted when the operator sets the insert switch S4. Both procedures were already explained.

(a) Station insertion after listening (dependent station switching):

In this case, switch control current Ia must be furnished initially to activate switch S1 in the distribution panel, and when the command is received, control current Ib must be furnished (instead of Ia) to activate both switches S1 and S2. For station disconnection, control current Ib can just be interrupted so that both distribution panel switches are deactivated.

(b) Immediate station insertion (independent station switching):

In this case, no control current Ia is required (listening state not entered). Instead, control current Ib is immediately furnished to activate both switches S1 and S2 when insert switch S4 is set. For station disconnecting, control current Ib has just to be interrupted (as in case a).

One of these two insertion procedures is selected by setting select switch 201 (FIG. 7B). Switch S4 is manually set by an operator when the respective station is to be inserted, and it remains closed until it is manually interrupted for effecting station disconnection. Amplifier 203 furnishes the respective ON or OFF signal to switch 201.

For procedure (a), switch 201 is in its lower position. A preparatory signal is supplied to AND gates 205 and 207. Latch circuit 209 is initially in RESET state. Its output signal on line 211 will be transferred by AND gate 205 to control line 213 as "GATE Ia" signal. As soon as the switch command signal is activated on line 77, a SET signal is supplied through AND gate 207 to latch 209. As a result, the output signal on line 215 will be activated, so that through OR gate 217 a signal "GATE Ib" is generated on line 219, while signal "GATE Ia" on line 213 is deactivated.

The situation remains unchanged as long as switch S4 remains closed. Once it is opened, inverter 221 will activate its output signal to prepare AND gate 223 connected to it. The next activation of the switch command signal on line 77 which is also connected to AND gate 223 will cause a RESET pulse to be furnished to latch 209. As a result, control signal "GATE Ib" is deactivated, but control signal "GATE Ia" will not be reactivated.

For procedure (b), switch 201 is in its upper position. In this case, the ON or OFF signal from switch S4 and amplifier 203 is simply transferred to output line 225 and constitutes control signal "GATE Ib" which is furnished through OR gate 217 to control current line 219. When S4 is closed, this signal is active, when S4 is interrupted, it is deactivated.

For generating the disabling signal for transmitter T during a switchover interval, a latch circuit 227 and a timeout circuit 229 are connected through a differentiating circuit 231 to the "GATE Ib" control line 219. When the signal level on line 219 changes, i.e. in the moment when distribution panel switch S2 is closed or opened, latch 227 will be set to furnish the transmitter disabling signal on its output line 233. Timeout circuit 229 is started simultaneously, and after a given time it will reset latch 227, resulting in deactivation of the disabling signal. Thus, for each switchover operation of S2, the transmitter will be disabled during a fixed time to obtain a clear energy outage which is required for freezing the PLL circuitry in the next station on the ring.

If only procedure (b), i.e. immediate station insertion, is to be used in a system, switch 201 and all elements in the lower part of FIG. 7B can be eliminated. I.e., the signal from insert switch S4 can be directly used to control the switching of current Ib. In this case, the current source of FIG. 7A could also be reduced by eliminating the branches for current Ia.

ADDITIONAL FEATURES AND ALTERNATIVES

Coupling of Ring Adapter to Branch Lines:

The ring adapter as shown in FIG. 3 has two transformers 65 and 67 for coupling its receiver 55 and transmitter 57 to branch lines 41 and 43, respectively. This inductive coupling can of course be replaced by capacitive coupling to avoid the transformers if this is preferred. In case of capacitive coupling, dc control lines 79 and 81 for currents Ia and Ib, respectively, have to be coupled to branch lines 41 and 43 each by a single inductive impedance with center tapping.

Energy Detector:

The energy detector block (67) in the control logic of timing and control unit TCU (FIG. 6) which detects whether signal energy is present on lines 75 and thus on the transmission ring, should preferably have some response lag when energy ceases, i.e. once signal energy was present, it should indicate energy outage by its output signal only with a given delay of e.g. one bit interval. This will avoid responding of the circuitry to very short signal interruptions which are not due to either station insertion or removal, or to an actual failure. Such inertia of the energy detector can be achieved by usual means for introducing a fixed delay such as a single shot circuit, a counter, or an integrating arrangement.

Cascaded Distribution Panels:

In the embodiment disclosed, each station and its ring adapter are inserted into the transmitting ring by one distribution panel the switches of which are controlled from the ring adapter.

As an improvement for certain situations, a cascaded arrangement of distribution panels could be provided as follows: Primary distribution panels are arranged in the ring and remote secondary distribution panels are connected to the primary distribution panels by extension lines. Adapters and stations are then attached to the secondary panels. Switches in primary panels are manually activated to either insert or bypass the respective extension lines. Switches in secondary panels are activated from the ring adapters, as described above in connection with FIG. 2.

This is of advantage if a cluster of stations is located remote from the basic transmission ring. Instead of having branch lines between ring and ring adapter for each station, only a single pair of extension lines would be necessary between the primary and the secondary distribution panels, and individual branch lines between the secondary distribution panel and each individual adapter could be kept very short. Thus, in case cascaded distribution panels are used, the basic ring has to be extended only by a single extension loop between primary and secondary distribution panels, whereas otherwise, n extension loops connected in series would be added to the basic ring when all n stations of the cluster are inserted.

We claim:

1. Method for connecting or disconnecting selected stations (T1 . . . T6, FIG. 1) in a communication system including a closed loop transmission ring to which a variable number of stations may be connected, connecting circuitry (A1 . . . A6, FIG. 1; FIG. 3) comprising phase-locked loop circuitry (FIGS. 5A, 5B) for synchronization being provided with each such station, characterized in that the transmission ring is temporarily interrupted when a selected station is connected or disconnected, the resulting interruption of signal energy is detected in the connecting circuitry of the next station down the ring, and causes freezing the respective phase-locked loop circuitry at its current frequency and phase, reappearance of signal energy is detected in said connecting circuitry of said next station and causes defreezing and reactivation of the respective phase-locked loop circuitry.

2. Method in accordance with claim 1, characterized in that any selected station to be connected is passively attached to the ring so that it can receive data signals propagating around the transmission ring and can be synchronized to these data signals, a specific bit pattern is propagated around the ring as switching command, said bit pattern causes connection or disconnection, respectively, of each selected station to or from the ring, whereby due to signal energy interruption and subsequent signal energy reappearance, the phase locked loop circuitry of each station following a selected station which is connected or disconnected, is temporarily frozen at its frequency and phase.

3. Communication system including a closed loop transmission ring (11) and a plurality of data stations (T1 . . . T6) which can be selectively connected to said ring by a plurality of switching units (25 . . . 33) in said ring, characterized in that for each station, connecting circuitry (A1 . . . A6) is provided including a phase-locked loop arrangement (61, FIG. 3; FIGS. 5A, 5B) for locally deriving a clock signal from received data signals, said phase-locked loop arrangement comprising control means (113, FIG. 5A; FIG. 6) for detecting a signal energy interruption on said ring and for generating a respective freeze control signal (147), and freeze means (149, 151, 155, 157) responsive to said freeze control signal for maintaining the clock signal derived by said phase-locked loop arrangement at its frequency and/or phase when a signal energy interruption is detected.

4. Communication system in accordance with claim 3, in which each said phase-locked loop arrangement (FIGS. 5A, 5B) includes phase and frequency error detectors (115, 117) for generating change control signals (127, 133), current generators (129, 135) responsive to said change control signals, filter circuitry (119) connected to said current generators and a voltage-controlled oscillator (121) connected to said filter, characterized in that said freeze means include gating circuitry (149, 151) for inhibiting said change control signals in response to said freeze control signal (147).

5. Communication system in accordance with claim 4, characterized in that in each said phase-locked loop arrangement (FIGS. 5A, 5B) sample-and-hold circuitry (C3, 153) is provided, and that said freeze means includes switching means (155, 157) which, in response to said freeze control signal (147) either connects both said voltage-controlled oscillator (121) and said sample-and-hold circuitry to the output of said filter circuitry (119), or disconnects both from said filter circuitry and instead connects the input of said voltage-controlled oscillator to the output of said sample-and-hold circuitry.

6. Communication system in accordance with claim 3, characterized in that said control means (FIG. 6) comprises energy detecting circuitry (167, 169) generating a signal energy interrupt indication (171) only after a given minimum duration of a signal energy interruption.

7. Communication system in accordance with claim 3 or claim 6, characterized in that said control means (FIG. 6) comprises circuitry (175, 177, 178) for maintaining said freeze control signal (147) active for a minimum given time interval after indication of a signal energy interruption by energy detecting circuitry (167, 169).

8. Communication system in accordance with claim 3, characterized in that each switching unit (25 . . . 33) comprises switches (S1, S2, 91a, 91b, 93a, 93b) for either directly closing said transmission ring (11) in a bypass state, or for inserting said connecting circuitry (FIG. 3) of a station via branch lines (41, 43) into said ring in an activated state, said switches are powered and controlled from said connecting circuitry, and said switches interrupt said transmission ring temporarily when they change from bypass state to activated state, or vice versa, to thus cause a signal energy interruption on the ring.

9. Communication system in accordance with claim 8, characterized in that said control means (FIG. 6) in each said connecting circuitry (FIG. 3) comprises data furnishing means (181, 183) responsive to said freeze control signal (147) to provide an auxiliary data signal (71) for application to said transmission ring (11) with said control means recognizes a signal energy interruption.

10. Communication system in accordance with claim 8, in which each said connecting circuitry (FIG. 3) comprises a transmitter unit (57) for repeating data signals received from said transmission ring (11) or for forwarding signals (47) furnished by the respective station, characterized in that disabling control means (227, 229, 231) are provided which are responsive to a switch control signal (219) for generating a disabling signal of a given duration (233) for said transmitting unit after activation of said switching control signal.

11. Communication system in accordance with claim 8, characterized in that said switches (S1, S2, 91a, 91b, 93a, 93b) are direct-current controlled, and that a direct current (Ia, Ib) for powering and controlling said switches is furnished from said connecting circuitry (FIG. 3) to said switching unit (FIG. 4) through a phantom circuit using said branch lines (41, 43) which are ac coupled to said connecting circuitry and said switching unit for data signal transfer.

12. Communication system in accordance with claim 11, characterized in that said switches (S1, S2, 91a, 91b, 93a, 93b) additionally have an auxiliary state in which said transmission ring (11) is directly closed but said connecting circuitry (FIG. 3) is connected to said transmission ring by said branch lines (41, 43), and that said switches in response to a dc control current in one direction (Ib) assume said activated state, and in response to a dc control current in the other direction (Ia) assume said auxiliary state.

* * * * *